US006899434B2

(12) United States Patent
Morishita

(10) Patent No.: US 6,899,434 B2
(45) Date of Patent: May 31, 2005

(54) PROJECTOR AND POWER SUPPLY DEVICE

(75) Inventor: Isaya Morishita, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 81 days.

(21) Appl. No.: 10/656,682

(22) Filed: Sep. 5, 2003

(65) Prior Publication Data

US 2004/0075402 A1 Apr. 22, 2004

(30) Foreign Application Priority Data

Sep. 5, 2002 (JP) .................................. 2002-005626 U

(51) Int. Cl.[7] .......................... G03B 21/20; H05B 41/36

(52) U.S. Cl. ..................... 353/85; 315/119; 315/200 R; 315/247; 315/307

(58) Field of Search .................... 353/85; 315/119–121, 315/127, 200 R, 246, 247, 224, 291, 307, 308

(56) References Cited

U.S. PATENT DOCUMENTS 6,791,285 B2 * 9/2004 Greenwood et al. ........ 315/307

FOREIGN PATENT DOCUMENTS

| | | | |
|---|---|---|---|
| JP | 8-172773 | 7/1996 | ............ H02M/3/28 |
| JP | P2000-224847 A | 8/2000 | ............ H02M/3/28 |
| JP | P2001-333573 A | 11/2000 | ............ H02M/3/28 |

* cited by examiner

*Primary Examiner*—W. B. Perkey
(74) *Attorney, Agent, or Firm*—Osha Liang LLP

(57) ABSTRACT

A projector judges whether a power-factor improving circuit disposed between a rectifying circuit and a DC—DC converting circuit is operated or not, from a voltage appearing in an auxiliary winding wound in the primary side of a transformer to which an output of the power-factor improving circuit is applied. If it is judged that the power-factor improving circuit is not operated, a lamp power supplying circuit to which the output of the power-factor improving circuit is supplied, and which turns on a light source lamp is stopped. Therefore, the light source lamp can be prevented from being unnecessarily impaired, and the power consumption of the main unit can be suppressed, so that the running cost can be reduced.

6 Claims, 3 Drawing Sheets

PROJECTOR AND POWER SUPPLY DEVICE

BACKGROUND OF THE INVENTION

1. Field of the Invention

The present invention relates to a power supply device in which a light source lamp, particularly, a vacuum discharge-based light source lamp is turned on by a DC output of a power-factor improving circuit (PFC), and also to a projector using such a power supply device.

2. Description of the Related Art

In a conventional projector, an image is displayed on an image display device such as a liquid crystal display device, and an image display face of the image display device is illuminated with light of the light source lamp which is turned on, to project the image displayed on the image display device onto a screen. Such a projector is configured so that reflected light or transmitted light from the image display device is projected onto a screen through a projection lens. A light source lamp that is used in a usual projector is a vacuum discharge-based light source lamp such as a mercury lamp.

Such a conventional projector uses a power supply circuit in which a commercial power source of, for example, AC 100 V is used as an input power supply, the input power is full-wave rectified by a rectifying circuit, an output of the rectifying circuit is upconverted by a power-factor improving circuit (PFC), and the voltage upconverted by the power-factor improving circuit is converted to a predetermined voltage by a DC—DC converting circuit. A power supply circuit in which a power-factor improving circuit is disposed between a rectifying circuit and a DC—DC converting circuit is disclosed in JP-A-8-172773, JP-A-2000-224847, and JP-A-2001-333573.

The projector is configured so that a light source lamp is turned on by a lamp power supplying circuit to which an output of the power-factor improving circuit is supplied as an input power supply, and is configured so that components on the secondary side such as a CPU controlling the operation of a main unit are operated by an output voltage of the DC—DC converting circuit.

In such a conventional projector, even when the power-factor improving circuit is not operated (the power-factor improving circuit is in the stop state), the lamp power supplying circuit continues to supply the power to the light source lamp. In the state where the power-factor improving circuit is not operated, the output of the rectifying circuit is not upconverted. For example, the case where a power supply of AC 100 V is input will be considered. When the power-factor improving circuit is not operated, the input power supply of the lamp power supplying circuit is DC 140 V which is the output of the rectifying circuit, and, when the power-factor improving circuit is operated, the input power supply is DC 380 V.

When the power-factor improving circuit is not operated, therefore, the amount of light emitted from the light source lamp is reduced because of the lowered input voltage of the lamp power supplying circuit. As a result, the image displayed on the image display device is not properly projected onto the screen. The use of a light source lamp under this situation lowers the characteristics of the light source lamp, and causes a failure due to the increased load of the lamp power supplying circuit.

SUMMARY OF THE INVENTION

It is an object of the present invention to provide a power supply device in which, when a power-factor improving circuit disposed between a rectifying circuit and a DC—DC converting circuit is not operated, a lamp power supplying circuit to which an output of the power-factor improving circuit is supplied as an input power supply to turn on a light source lamp is stopped, thereby preventing the light source lamp from being unnecessarily impaired, and also to provide a projector to which such a power supply device is applied.

In order to achieve the object, the power supply device of the invention is configured in the following manner.

A power supply device including:

a rectifying circuit which full-wave rectifies an input AC power supply;

a power-factor improving circuit which improves a power factor of an output of the rectifying circuit;

a lamp power supplying circuit to which a DC output of the power-factor improving circuit is supplied as an input power supply, and which supplies a power to a light source lamp;

a driver circuit which operates the lamp power supplying circuit; and a DC—DC converting circuit which uses a transformer to covert the DC output of the power-factor improving circuit to a DC current of a predetermined voltage, and which supplies the DC current to a secondary side;

wherein an auxiliary winding is disposed in a primary side of the transformer of the DC—DC converting circuit; and in accordance with a voltage appearing in the auxiliary winding, the driver circuit switches between a stop state and an operation state of the lamp power supplying circuit.

In this configuration, a primary winding connected to the output of the power-factor improving circuit, and the auxiliary winding are wound in the primary side of the transformer of the DC—DC converting circuit. A voltage appearing in a secondary winding wound in the secondary side of the transformer is used as a power supply for operating a CPU, a display device, and like components which are disposed on the secondary side.

For example, the auxiliary winding is wound in a direction along which, when a voltage applied to the primary winding is raised, the generated voltage is raised. The voltage which is applied to the primary winding when the power-factor improving circuit is operated is higher than that when the power-factor improving circuit is not operated. Therefore, also the voltage appearing in the auxiliary winding when the power-factor improving circuit is operated is higher than that when the power-factor improving circuit is not operated. As a result, when the voltage appearing in the auxiliary winding is detected, it is possible to judge whether a state where the light source lamp can be turned on to emit light of an adequate amount, i.e. where the power-factor improving circuit is properly operated is attained or not.

In accordance with the voltage appearing in the auxiliary winding which is wound in the primary side of the transformer of the DC—DC converting circuit, the driver circuit switches between a stop state and an operation state of the lamp power supplying circuit. Specifically, if it is judged from the voltage appearing in the auxiliary winding that a state where the light source lamp cannot be turned on to emit light of an adequate amount is produced, the driver circuit sets the lamp power supplying circuit to the stop state. By contrast, if it is judged from the voltage appearing in the auxiliary winding that a state where the light source lamp can be turned on to emit light of an adequate amount is produced, the driver circuit sets the lamp power supplying circuit to the operation state.

According to the configuration, the light source lamp can be prevented from being turned on when the power-factor improving circuit is not properly operated to cause the light source lamp not to be turned on to emit light of an adequate amount. Therefore, it is possible to prevent the light source lamp from being unnecessarily impaired.

The power-factor improving circuit may be a circuit in which a switching transistor and a control IC for controlling the switching transistor are disposed. In this case, the voltage appearing in the auxiliary winding can be used as a power supply for operating the control IC, so that the circuit configuration can be simplified.

DETAILED DESCRIPTION OF THE PREFFERED EMBODIMENTS

Hereinafter, a projector that is an embodiment of the invention will be described. A power supply device according to an embodiment of the invention is applied to the projector.

Figure 1:
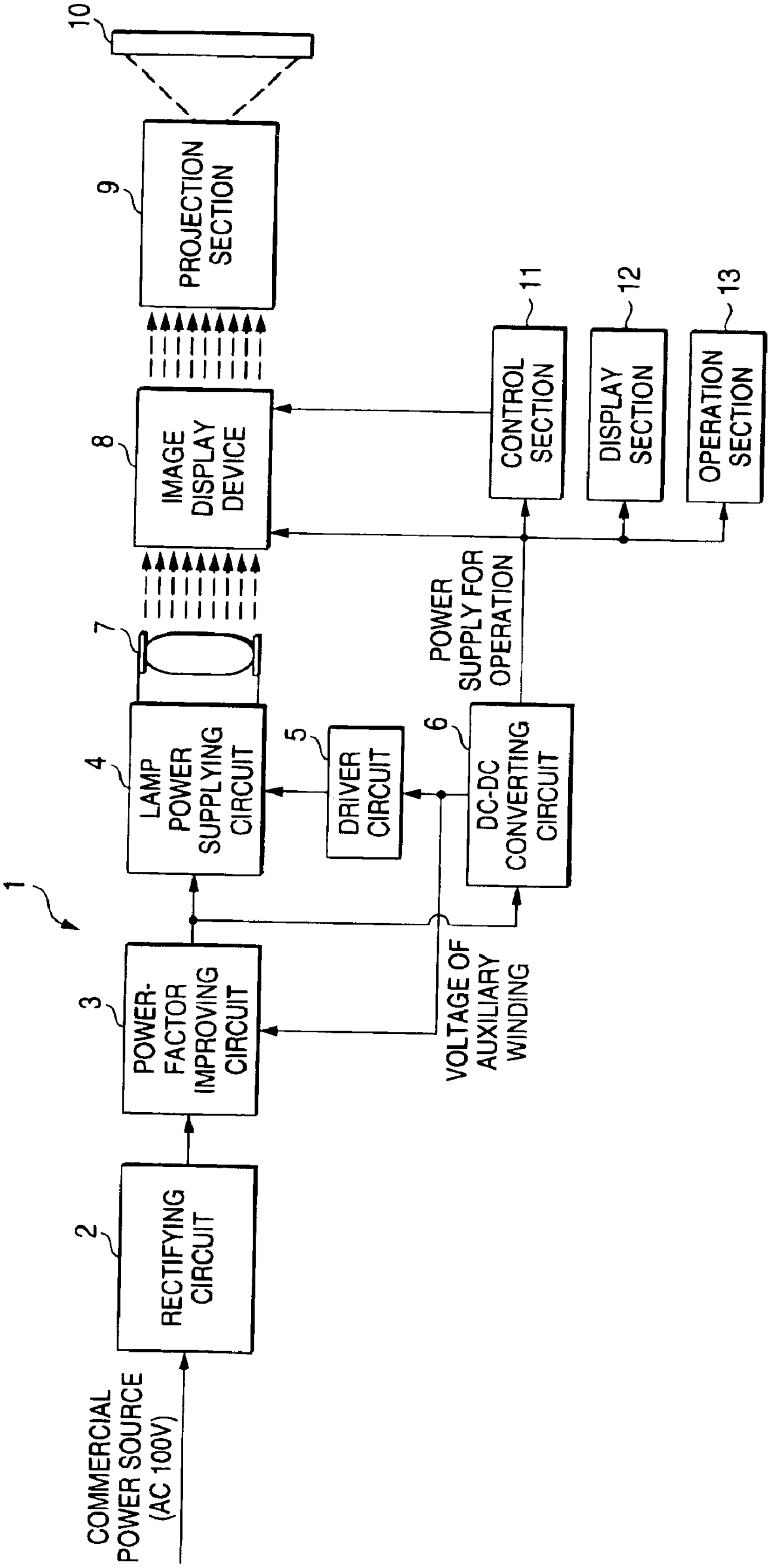
FIG. 1 is a block diagram showing a configuration of a projector according to an embodiment of the invention.

FIG. 1 is a block diagram showing the configuration of the projector of the embodiment of the invention. The projector 1 includes a rectifying circuit 2, a power-factor improving circuit 3, a lamp power supplying circuit 4, a driver circuit 5, a DC—DC converting circuit 6, a light source lamp 7, an image display device 8, a projection section 9, a control section 11, a display section 12, and an operation section 13. The power supply device is configured by the rectifying circuit 2, the power-factor improving circuit 3, the lamp power supplying circuit 4, the driver circuit 5, and the DC—DC converting circuit 6.

Figure 2:
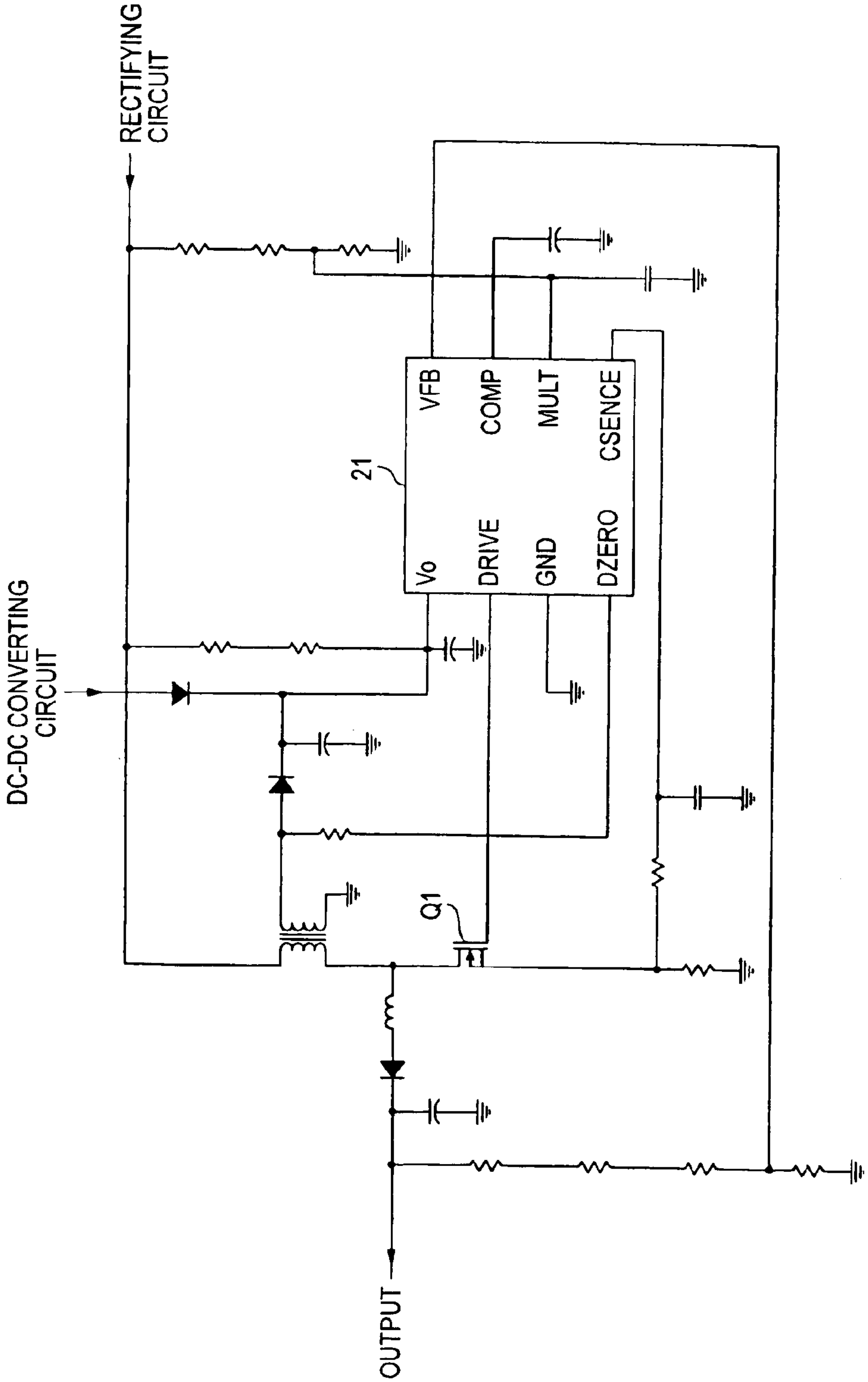
FIG. 2 is a diagram showing a power-factor improving circuit that is used in the projector.

A commercial power source of, for example, AC 100 V is input to the rectifying circuit 2. The rectifying circuit 2 has a diode bridge, and full-wave rectifies the input AC power supply. The rectifying circuit 2 outputs DC 140 V, and the output is supplied to the power-factor improving circuit 3. The power-factor improving circuit 3 (PFC) is a circuit which is shown in FIG. 2, and which upconverts the output of the rectifying circuit 2 (for example, upconverts DC 140 V to DC 380 V) and outputs the result of the upconversion. In the power-factor improving circuit 3, as well known in the art, a control IC 21 controls a switching transistor Q1 so as to upconvert the output of the rectifying circuit 2. A voltage appearing in an auxiliary winding which is wound in the primary side of a transformer T1 (flayback transformer) disposed in the DC—DC converting circuit 6 as described later is used as a power supply for operating the control IC.

The lamp power supplying circuit 4 receives the output of the power-factor improving circuit 3, and supplies a power required for energizing the lamp to the light source lamp 7. The lamp power supplying circuit 4 includes a starting circuit which, when the light source lamp 7 is to be turned on, applies a voltage that is higher than that of a usual time (turned-on state), to the light source lamp. The starting circuit is operated only during several seconds in a process of starting turning-on of the lamp 7. The driver circuit 5 switches between a stop state and an operation state of the lamp power supplying circuit 4. The operation state of the lamp power supplying circuit 4 means a state where the power required for turning-on is supplied to the light source lamp 7. By contrast, the stop state of the lamp power supplying circuit 4 means a state where the power required for turning-on is not supplied to the light source lamp 7 (the power supply is not performed). In accordance with the voltage appearing in the auxiliary winding which is wound in the primary side of the transformer T1 disposed in the DC—DC converting circuit 6 as described later, the driver circuit 5 switches between the stop state and the operation state of the lamp power supplying circuit 4.

The light source lamp 7 is a vacuum discharge-based light source lamp such as a mercury lamp.

Figure 3:
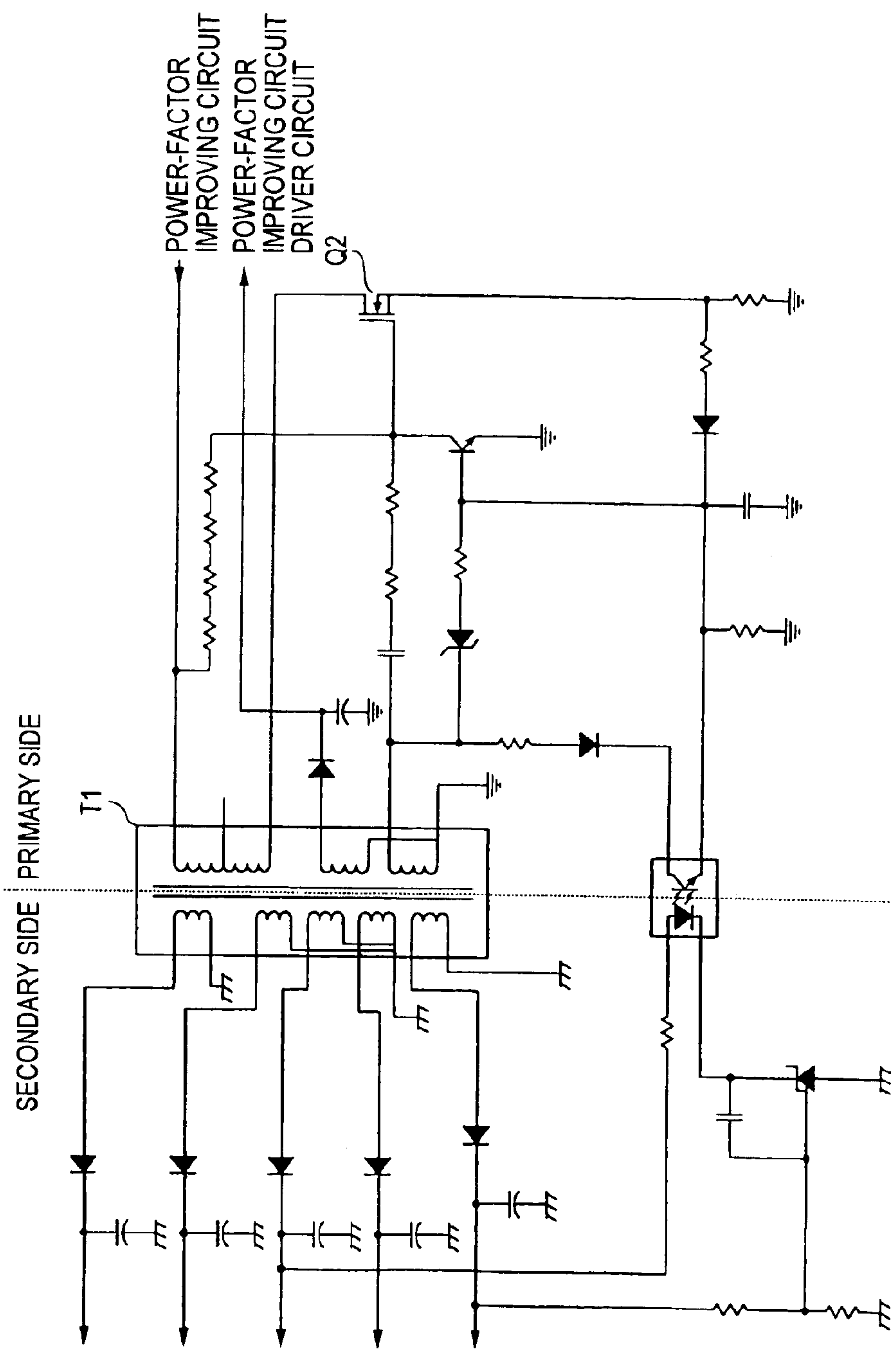
FIG. 3 is a diagram showing a DC—DC converting circuit that is used in the projector.

In the DC—DC converting circuit 6, as shown in FIG. 3, the output of the power-factor improving circuit 3 is converted to a predetermined voltage by means of the transformer T1. Voltages appearing in windings in the secondary side of the transformer T1 are supplied to various components on the secondary side, such as the control section 11, the display section 12, and the operation section 13 as power supplies for operating the components. The output of the power-factor improving circuit 3 is connected to the primary winding of the transformer T1. The auxiliary winding in the primary side of the transformer T1 is connected to the power-factor improving circuit 3 and the driver circuit 5. The voltage appearing in the auxiliary winding wound in the primary side of the transformer T1 is supplied as a power supply for operating the control IC 21. When the voltage appearing in the auxiliary winding wound in the primary side of the transformer T1 is higher than a preset voltage, the driver circuit 5 judges that the power-factor improving circuit 3 is properly operated, and, when the voltage is lower than the preset voltage, judges that the power-factor improving circuit 3 is not properly operated.

As shown in FIG. 3, another auxiliary winding for operating a switching transistor Q2 is wound in the primary side of the transformer T1. The two auxiliary winding in the primary side of the transformer T1 are wound in the same direction.

The image display device 8 displays an image that is a basic image to be projected onto a screen 10, and is configured by transmission or reflection type liquid crystal display device. The control section 11 controls the image that is to be displayed on the image display device 8. The projection section 9 is configured by a projection lens through which reflected light or transmitted light from the image display device 8 is projected onto the screen 10.

The display section 12 displays the operation state of a main unit of the projector 1. The operation section 13 is configured by switches through which input operations are to be performed on the main unit of the projector 1, and a receiver which receives a control command transmitted from a remote controller (not shown).

Hereinafter, the operation of the projector 1 of the embodiment will be described. In the projector 1, the commercial power source (AC 100 V) input to the main unit is rectified by the rectifying circuit 2, and then supplied to the power-factor improving circuit 3. The power-factor improving circuit 3 in the operation state upconverts the input (DC 140 V) from the rectifying circuit 2 to DC 380 V, and outputs the result of the upconversion.

When the operation of the power-factor improving circuit 3 is stopped, a DC voltage of 140 V is output from the power-factor improving circuit 3.

The DC—DC converting circuit 6 converts the DC voltage supplied from the power-factor improving circuit 3 to the predetermined voltage by using the transformer T1, and supplies the converted voltage to the control section 11, the display section 12, and the operation section 13 (the components on the secondary side) as power supplies for operating the components. The voltage appearing in the auxiliary winding wound in the primary side of the DC—DC converting circuit 6 is supplied as the power supply for operating the control IC 21 disposed in the power-factor improving circuit 3, and input to the driver circuit 5.

The control section 11 controls the image to be displayed on the image display device 8, the main unit on the basis of an input operation (including reception of a control command from the remote controller) by the user in the operation section 13, and the display on the display section 12.

The driver circuit 5 compares the voltage appearing in the auxiliary winding wound in the primary side of the transformer T1 disposed in the DC—DC converting circuit 6, with the preset voltage. The auxiliary winding is wound with the number of turns at which, when the power-factor improving circuit 3 is not operated (the voltage applied to the primary winding is 140 V), a voltage of about 5 V is generated, and, when the power-facor improving circuit 3 is operated (the voltage applied to the primary winding is 380 V), a voltage of about 14 V is generated.

In the case where the voltage appearing in the auxiliary winding wound in the primary side of the transformer T1 of the DC—DC converting circuit 6 is equal to or higher than, for example, 13 V, the driver circuit 5 judges that the power-factor improving circuit 3 is operated. By contrast, in the case where the voltage is lower than 13 V, the driver circuit judges that the power-factor improving circuit 3 is not operated. When it is judged that the power-factor improving circuit 3 is operated, the driver circuit 5 operates the lamp power supplying circuit 4. Specifically, the light source lamp 7 is connected to the lamp power supplying circuit 4, so that the light source lamp 7 is turned on by the output of the lamp power supplying circuit 4. In a process of starting turning-on of the light source lamp 7, the driver circuit 5 causes the starting circuit disposed in the lamp power supplying circuit 4 to operate only during several seconds, thereby turning on the light source lamp 7.

In the state where the power-factor improving circuit 3 is operated, the voltage which has been upconverted by the power-factor improving circuit 3 is input to the lamp power supplying circuit 4, and therefore the light source lamp 7 can be turned on so as to emit light of an adequate amount. The image display device 8 is illuminated with the light from the turned-on light source lamp 7. Reflected light (in the case where the image display device is configured by a reflection type liquid crystal display device) or transmitted light (in the case where the image display device is configured by a transmissive type liquid crystal display device) impinges on the screen 10 through the projection lens of the projection section 9, so that the image displayed on the image display device 8 is properly displayed on the screen 10.

By contrast, in the case where it is judged that the power-factor improving circuit 3 is not operated based on the voltage appearing in the auxiliary winding wound in the primary side of the transformer T1 of the DC—DC converting circuit 6, the driver circuit 5 does not operate the lamp power supplying circuit 4. Specifically, the light source lamp 7 is disconnected from the lamp power supplying circuit 4, so that the light source lamp 7 is turned off.

When the main unit of the projector 1 is activated, there is a small time lag before the power-factor improving circuit 3 operates. Thereafter, the power-factor improving circuit 3 starts to operate, the voltage appearing in the auxiliary winding wound in the primary side of the transformer T1 of the DC—DC converting circuit 6 is raised, and the driver circuit 5 operates the lamp power supplying circuit 4 as described above, thereby turning on the light source lamp 7. Consequently, there arises no problem in the operation of the main unit of the projector 1.

In a state where the power-factor improving circuit 3 does not operate entirely by a failure or the like, the voltage input to the lamp power supplying circuit 4 is DC 140 V which has not been upconverted by the power-factor improving circuit 3, and therefore the light source lamp 7 cannot emit light of an adequate amount. In this sate, when the light source lamp 7 is connected to the lamp power supplying circuit 4, a large load is applied to the lamp power supplying circuit 4, thereby increasing the possibility that the lamp power supplying circuit 4 breaks down. In the projector 1 of the embodiment, as described above, when the power-factor improving circuit 3 is not operated, the driver circuit 5 does not operate the lamp power supplying circuit 4 (the light source lamp 7 is not connected to the lamp power supplying circuit 4), and hence the lamp power supplying circuit 4 can be prevented from breaking down. Even when the light source lamp 7 is turned on in the state where the power-factor improving circuit 3 is not operated, the lamp emits only light of a small amount, and therefore the image displayed on the image display device 8 cannot be properly displayed on the screen 10. Therefore, where the light source lamp 7 is not turned on when the power-factor improving circuit 3 is not operated, there arises no problem. The light source lamp 7 is not wastefully turned on, and hence the light source lamp 7 can be prevented from being unnecessarily impaired. Consequently, the life of the light source lamp 7 can be prolonged, and the power consumption of the main unit of the projector 1 can be suppressed, so that the running cost can be reduced.

Since the projector 1 of the embodiment has the configuration in which the voltage appearing in the auxiliary winding wound in the primary side of the transformer T1 of the DC—DC converting circuit 6 is used as the power supply for operating the control IC 21 controlling the switching transistor Q1 of the power-factor improving circuit 3, the circuit configuration can be simplified, and the production cost of the main unit of the projector 1 can be prevented from being increased.

Although, in the embodiment described above, the power supply device is applied to the projector 1, the power supply device of the invention can be applied to various apparatuses in which a power-factor improving circuit is disposed between a rectifying circuit for rectifying an input commercial power supply and a DC—DC converting circuit, and a light source lamp is turned on by an output of the power-factor improving circuit.

As was described above, according to the invention, from the voltage appearing in the auxiliary winding wound in the primary side of the transformer of the DC—DC converting circuit, it is judged whether the power-factor improving circuit disposed between the rectifying circuit and the DC—DC converting circuit is operated or not, and, if the power-factor improving circuit is not operated, the light source lamp is not turned on. Therefore, the light source lamp can be prevented from being unnecessarily impaired, and the power consumption of the main unit can be suppressed, so that the running cost can be reduced.

Since the invention is configured so that the voltage appearing in the auxiliary winding wound in the primary side of the transformer of the DC—DC converting circuit is used as the power supply for operating the control IC of the power-factor improving circuit, the circuit configuration can be simplified, and the production cost of the main unit can be prevented from being increased.

What is claimed is:

1. A projector comprising:

an image display device which displays an image;

a projection section which illuminates the image display device with a light source lamp to project reflected light or transmitted light from the image display device onto a screen, thereby projecting the image displayed on the image display device onto the screen;

a rectifying circuit which full-wave rectifies an AC power supply input to a main unit;

a power-factor improving circuit which improves a power factor of an output of the rectifying circuit;

a lamp power supplying circuit to which a DC output of the power-factor improving circuit is supplied as an input power supply, and which supplies a power to the light source lamp;

a driver circuit which operates the lamp power supplying circuit; and a DC—DC converting circuit which uses a transformer to covert the DC output of the power-factor improving circuit to a DC current of a predetermined voltage, and which supplies the DC current to a secondary side;

wherein an auxiliary winding is disposed in a primary side of the transformer of the DC—DC converting circuit;

the power-factor improving circuit is a circuit which has a switching transistor and a control IC for controlling the switching transistor, and in which a voltage appearing in the auxiliary winding is used as a power supply for operating the control IC; and when the voltage appearing in the auxiliary winding is lower than a preset voltage, the driver circuit sets the lamp power supplying circuit to a stop a state.

2. A power supply device comprising:

a rectifying circuit which full-wave rectifies an input AC power supply;

a power-factor improving circuit which improves a power factor of an output of the rectifying circuit;

a lamp power supplying circuit to which a DC output of the power-factor improving circuit is supplied as an input power supply, and which supplies a power to a light source lamp;

a driver circuit which operates the lamp power supplying circuit; and a DC—DC converting circuit which uses a transformer to covert the DC output of the power-factor improving circuit to a DC current of a predetermined voltage, and which supplies the DC current to a secondary side;

wherein an auxiliary winding is disposed in a primary side of the transformer of the DC—DC converting circuit;

the power-factor improving circuit is a circuit which has a switching transistor and a control IC for controlling the switching transistor, and in which a voltage appearing in the auxiliary winding is used as a power supply for operating the control IC; and when the voltage appearing in the auxiliary winding is lower than a preset voltage, the driver circuit sets the lamp power supplying circuit to a stop state.

3. A power supply device comprising:

a rectifying circuit which full-wave rectifies an input AC power supply;

a power-factor improving circuit which improves a power factor of an output of the rectifying circuit;

a lamp power supplying circuit to which a DC output of the power-factor improving circuit is supplied as an input power supply, and which supplies a power to a light source lamp;

a driver circuit which operates the lamp power supplying circuit; and a DC—DC converting circuit which uses a transformer to covert the DC output of the power-factor improving circuit to a DC current of a predetermined voltage, and which supplies the DC current to a secondary side;

wherein an auxiliary winding is disposed in a primary side of the transformer of the DC—DC converting circuit; and in accordance with a voltage appearing in the auxiliary winding, the driver circuit switches between a stop state and an operation state of the lamp power supplying circuit.

4. The power supply device according to claim 3, wherein, when the voltage appearing in the auxiliary winding is lower than a preset voltage, the driver circuit sets the lamp power supplying circuit to the stop state.

5. The power supply device according to claim 3, wherein the power-factor improving circuit is a circuit which has a switching transistor and a control IC for controlling the switching transistor, and in which the voltage appearing in the auxiliary winding is used as a power supply for operating the control IC.

6. The power supply device according to claim 4, wherein the power-factor improving circuit is a circuit which has a switching transistor and a control IC for controlling the switching transistor, and in which the voltage appearing in the auxiliary winding is used as a power supply for operating the control IC.

* * * * *